United States Patent
Bocka et al.

(10) Patent No.: US 7,475,482 B2
(45) Date of Patent: Jan. 13, 2009

(54) BEVEL QUADRANT AND GEARBOX LOUVER BLOWER SYSTEM

(75) Inventors: Ralf Bocka, Nuremberg (DE); Joseph Z. Wascow, Mundelein, IL (US); Patrick B. Thomas, Mount Prospect, IL (US)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 11/034,497

(22) Filed: Jan. 13, 2005

(65) Prior Publication Data
US 2005/0178256 A1  Aug. 18, 2005

(51) Int. Cl.
  *B27B 9/02* (2006.01)
  *B25F 3/00* (2006.01)
(52) U.S. Cl. .............................. 30/376; 30/388; 30/391; 30/123.3; 83/170
(58) Field of Classification Search ................... 83/707, 83/478, 571, 729, 730, 859, 167, 100, 700, 83/169, 170; 30/122, 124, 388, 390, 123, 30/123.2, 514, 516, 123.6, 376, 391, 377, 30/389, 374, 375; 15/301, 341, 344, 405, 15/246.2, 399, 300.1; 125/12, 13.01, 13.02; 408/61; D8/61–70; 81/57.11, 54, 57.42
See application file for complete search history.

(56) References Cited

U.S. PATENT DOCUMENTS

| | | | | |
|---|---|---|---|---|
| 1,708,345 A * | 4/1929 | Wodack et al. | ................. | 30/377 |
| 1,830,579 A * | 11/1931 | Wappat | ........................ | 30/391 |
| 1,833,785 A * | 11/1931 | Krieger | .......................... | 83/98 |
| 2,795,248 A * | 6/1957 | Doerner | ........................ | 30/391 |
| 3,085,603 A * | 4/1963 | Stanley | ........................ | 30/392 |
| 3,267,974 A | 8/1966 | Elson | | |
| 3,873,862 A | 3/1975 | Butler | | |
| 3,977,080 A * | 8/1976 | Allaire | ........................ | 30/376 |
| 5,084,971 A * | 2/1992 | Remington et al. | ........... | 30/123 |
| 5,433,008 A * | 7/1995 | Barger et al. | .................. | 30/376 |
| 5,539,985 A * | 7/1996 | Wershe | ........................ | 30/123.3 |
| 5,701,675 A * | 12/1997 | Hall et al. | ...................... | 30/123 |
| D421,702 S * | 3/2000 | Sakai et al. | ..................... | D8/66 |
| 6,173,499 B1 * | 1/2001 | Hegoas et al. | ............... | 30/123.3 |
| 6,898,854 B2 * | 5/2005 | Zemlok et al. | ................. | 30/122 |
| 7,103,979 B2 * | 9/2006 | Yoshida et al. | ................. | 30/376 |
| 2003/0131484 A1 * | 7/2003 | Yoshida et al. | ................. | 30/376 |
| 2003/0226264 A1 | 12/2003 | Zemlok et al. | | |
| 2004/0107584 A1 * | 6/2004 | Yoshida et al. | ................. | 30/391 |

FOREIGN PATENT DOCUMENTS

| | | |
|---|---|---|
| EP | 0 445 972 | 9/1991 |
| EP | 1 245 357 | 10/2002 |
| JP | 07149139 A * | 6/1995 |

OTHER PUBLICATIONS

Makita Corporation, Circular Saw Model 5007NB Instruction Manual, Apr. 9, 1984.

* cited by examiner

*Primary Examiner*—Ghassem Alie
(74) *Attorney, Agent, or Firm*—Greer, Burns & Crain, Ltd

(57) ABSTRACT

A circular saw has one or more louvers in the housing which direct air exiting the housing toward a work piece, together with openings in other components of the saw located between the louvers and the work piece so that sawdust and other debris that is produced during operation of the saw will be blown out of the way and will not interfere with the line of sight of the user.

11 Claims, 4 Drawing Sheets

BEVEL QUADRANT AND GEARBOX LOUVER BLOWER SYSTEM

BACKGROUND OF THE INVENTION

The present invention generally relates to power hand tools and more particularly to circular saws.

Power hand tools such as circular saws have been commonly known for decades and generally have a foot plate that slides on a work piece that is being cut, a circular saw blade that may have a diameter as small as a few inches or as large as seven or more inches, with the saw blade extending through an opening generally perpendicular to the plane of the foot. The saw is typically driven by an electric motor that is powered by either an AC or DC power source, the DC power source often being a battery pack or the like.

Circular saws are commonly used on construction sites to saw boards that are used in framing a building or for cutting large plywood or other material sheets into smaller pieces, all of which are known to those skilled in the power hand tool art. Such circular saws have been the subject of much research and development and significant improvements have been made in their design and construction over the many decades that they have been used.

Significant developments have included improved blade guards, both above and below the blade for protecting a user from injury, with the lower blade guards being designed to be moved out of the way when a board or the like is to be cut. Ergonomic developments have been made so that user handles, including main handles or auxiliary handles, facilitate the easy cutting of a sheet or board along a desired path. The early circular saws were designed to only make perpendicular cuts relative to the work piece, but later developments included an adjustable bevel angle capability.

Even with the many improvements that have been made in the design of circular saws, a common problem that continues to exist is the accumulation of sawdust and/or other debris on the line of cut which hinders the user from following the desired cut line to produce a straight and accurate cut. Improvements in motors that are used in circular saws and other hand tools have resulted in the motors being smaller in size relative to the power that they develop. Because cutting of some materials, particularly those which are relatively thick, put a significant load on the motor, it is necessary to have an adequate flow of air near the motor to dissipate heat during operation. Because of this requirement, many motors have an internal fan blade driven by the motor to expel air from the motor enclosure or housing for the purpose of cooling the motor. The air has been expelled through openings that have been positioned at many different locations in circular saws of the prior art.

While the circular saw designs are sufficient to expel the air and dissipate heat during operation, little regard has heretofore been made in directing the air in any particular direction or for any apparent purpose other than to expel the air from inside the motor housing.

SUMMARY OF THE INVENTION

The preferred embodiment of the present invention comprises one or more louvers in the housing of a hand tool such as a circular saw, which direct the air toward a specific location that includes the work piece, together with providing openings in other components of the tool located between the louvers and the portion of the work piece that the saw is approaching so that sawdust and other debris that is produced during operation of the tool will be blown out of the way and will not interfere with the line of sight of the user.

The preferred embodiment is a circular saw having a gearbox located adjacent the output of the motor between the motor and the saw blade, with the gearbox having directional louvers that direct air produced by an internal fan blade used to cool the motor toward the portion of the work piece that is to be cut. The preferred embodiment also comprises a bevel quadrant structure located on the front of the foot of the circular saw, with the quadrant having one or more airflow vents within it so that the air expelled through the directional louvers can also flow through the foot quadrant toward the portion of the work piece that the saw blade is approaching and thereby remove the sawdust and/or other debris from the line of cut.

DETAILED DESCRIPTION

Figure 1:
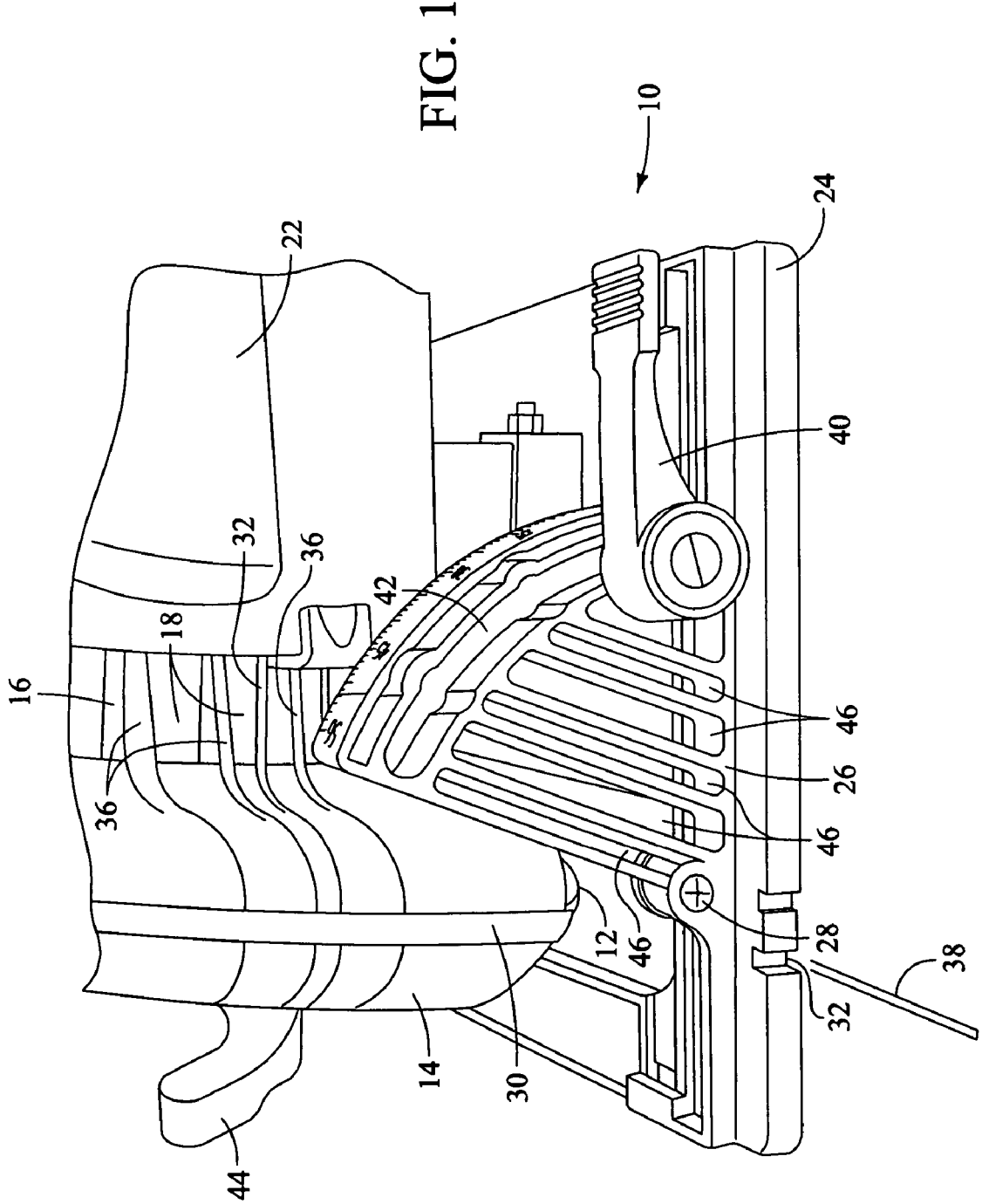
FIG. 1 is a generally front perspective of a circular saw illustrating the preferred embodiment of the present invention, and particularly illustrating the directional louvers in a gearbox of the saw as well as a bevel quadrant having a plurality of airflow vents through which air generated by the internal fan of the circular saw can pass to clear the line of cut of the saw of sawdust and other debris.
Figure 2:
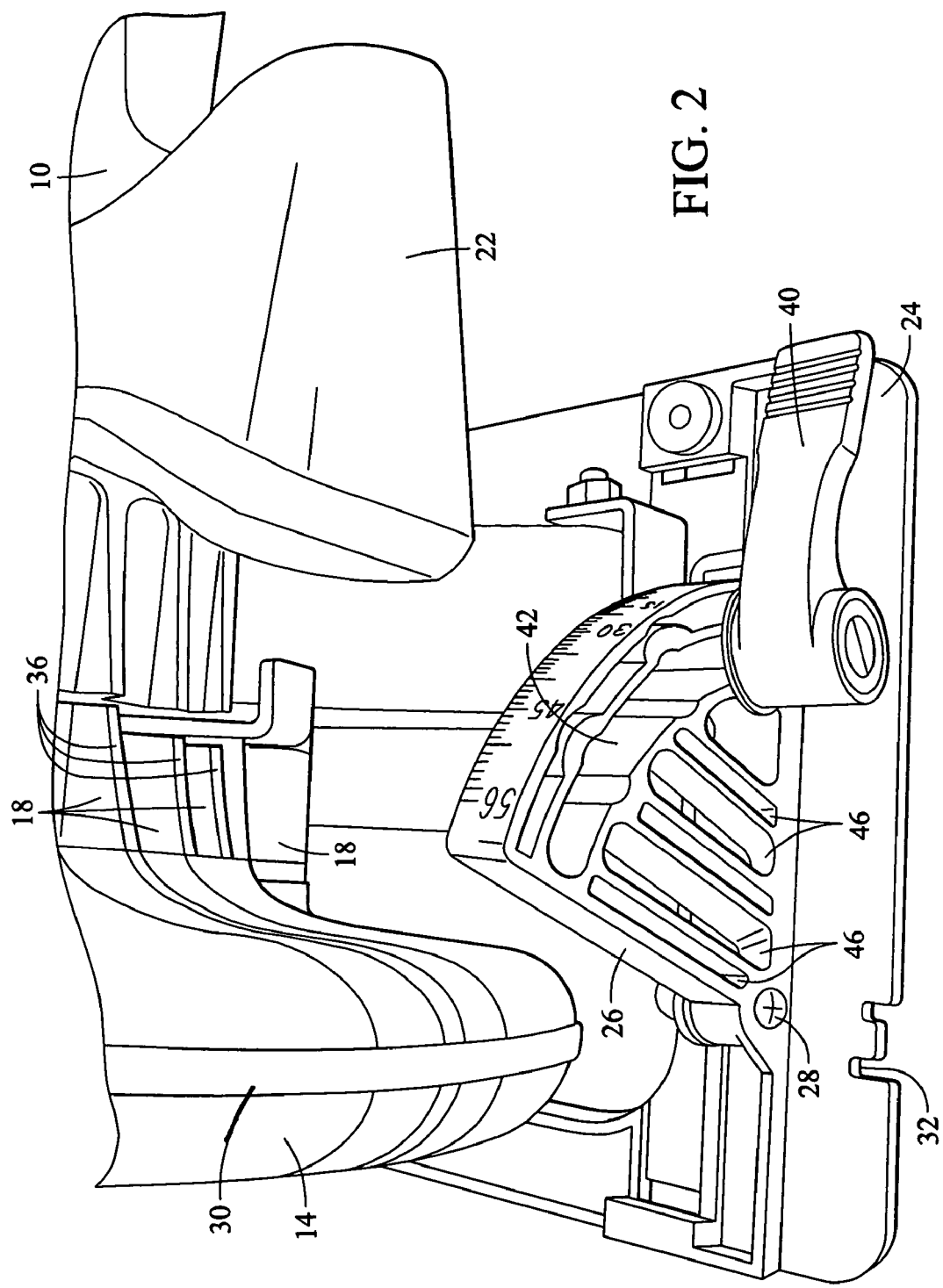
FIG. 2 is another front perspective view similar to FIG. 1, but taken from a higher elevation.

The preferred embodiment of the present invention is shown in FIGS. 1-4 and is directed to a circular saw of the type which has a motor housing 10 in which a motor 11 is located, a saw blade 12 that is protected by a blade housing 14, the blade housing 14 being attached to a gearbox end casting 16 that is in turn connected to the housing 10 and which has a number of vent openings 18 through which air from a fan 20 is expelled during operation of the circular saw. The circular saw also has a forward auxiliary handle 22 as well as a main handle (not shown) that is typical with such circular saws.

The circular saw also has a generally flat foot assembly 24 which preferably has an integrally formed quadrant structure 26 that is part of a bevel adjusting mechanism that is configured to enable the saw to cut a work piece at an adjustable bevel angle. Preferably, the bevel angle can be adjusted from perpendicular to approximately 55° from perpendicular by pivoting the motor housing 10 as well as the blade 12 and 14 around a pivot axis defined by a bolt 28.

Figure 3:
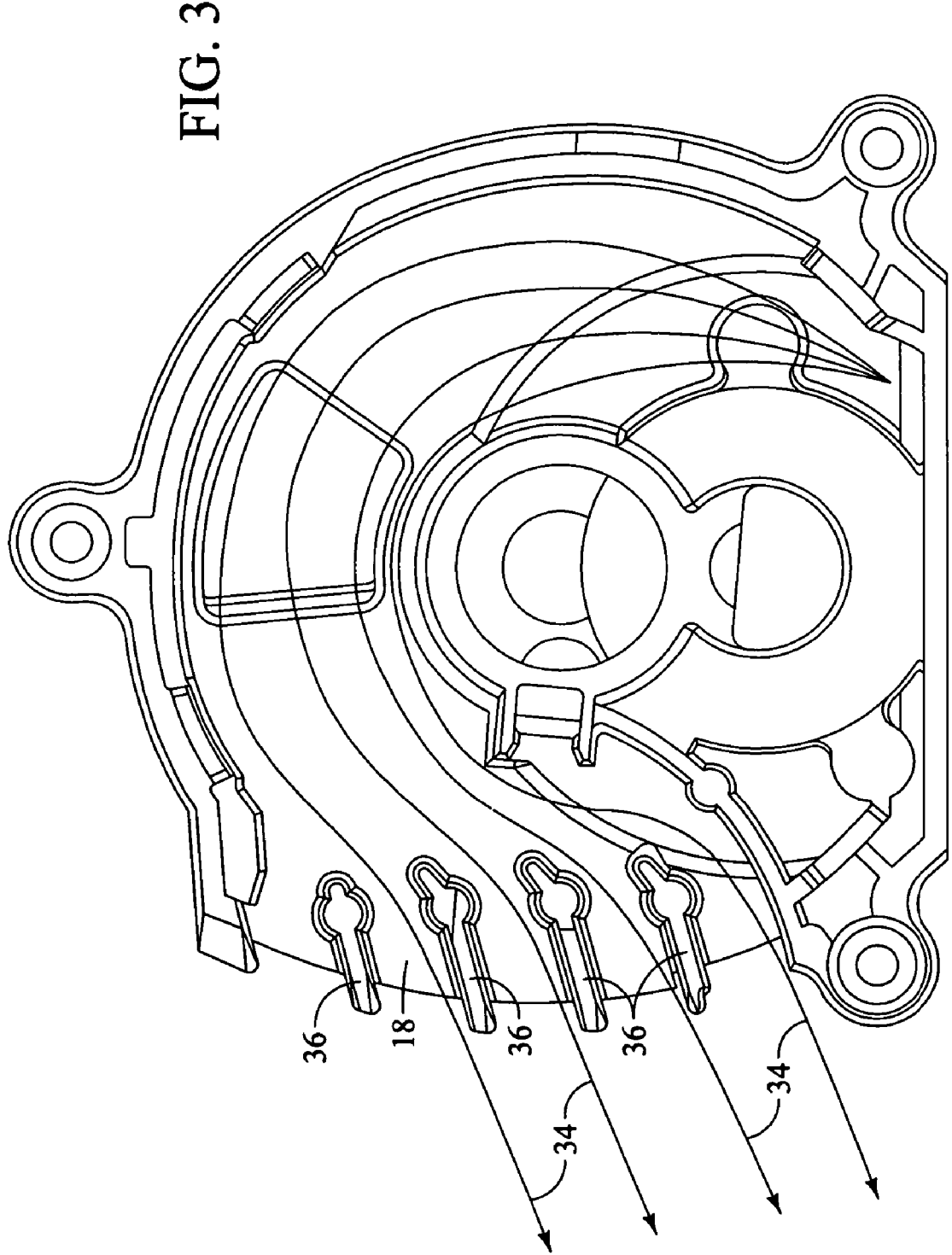
FIG. 3 is a plan view of the inside of a portion of the gearbox end casting illustrating the configuration of the louvers therein and the direction of flow produced by the internal fan blade of the circular saw illustrated in FIG. 1.
Figure 4:
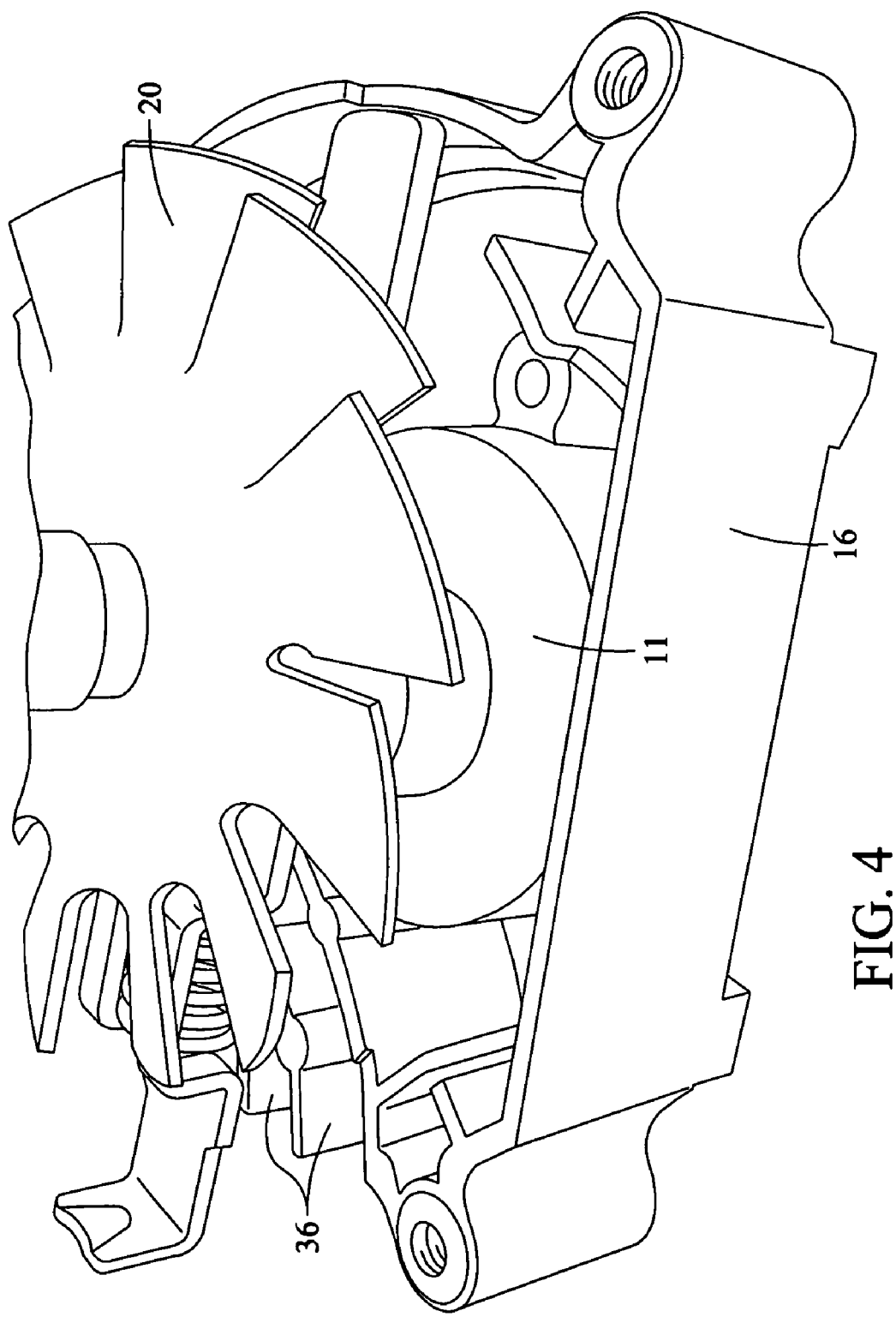
FIG. 4 is a perspective view illustrating a portion of the saw motor and the internal fan blade which creates the airflow that is expelled through the louvers of the gearbox.

In the embodiment illustrated in FIG. 1, the blade housing 14 has a raised center portion 30 that is generally aligned with the plane of the blade 12. A notch 32 in the front edge of the foot 24 is also provided to indicate a more accurate line of the cut when set at a zero degree bevel that results from cutting by the blade 12. As shown in FIG. 3, the air that is generated by the fan blade 20 flows in a generally counterclockwise direction in the housing 10 as shown by the arrows 34 and exits out of vent openings 18 defined by louvers 36. There are four louvers 36 which have slightly different lengths and angular orientations, but all are oriented to direct the air flow produced by the fan blade 20 forwardly of the circular saw toward the portion of the work piece that is to be cut generally along the line 38.

The quadrant 26 is preferably integrally formed with the foot 24 in the embodiment illustrated in the drawings, but it should be understood that the quadrant can also be separately made and attached to the foot 24. As illustrated in the drawings, the foot 24 is configured to provide an adjustable bevel angle when it is rotated relative to the saw housing 10, blade 12 and blade housing 14 about the axis of the bolt 28 and a separate bolt (not shown) located at the rear of the foot 24.

A clamping lever 40 attached to the motor housing 10 is slidable in an arcuate slot 42 having a radius that is constant around the bolt 28. When the lever 40 is rotated in the counterclockwise direction as shown in FIG. 1, it loosens the mechanism so that the foot can be rotated relative to the motor housing 10 to cause the blade 12 to be moved to a different bevel angle. When the angle is at the desired location, the lever 40 can be rotated in the clockwise direction to tighten the same and hold the saw at the desired bevel angle. A lower blade guard lift lever 44 is shown to the left of the blade housing 14 and this lever enables the user to manually move the lower guard as is sometimes necessary during operation of a circular saw.

While the air that is expelled from the motor housing 10 through the openings 18 is directed forwardly, the quadrant 26 has openings 46 as well as the slot 42 which function as vents and permit the air to pass relatively unimpeded through the quadrant 26 onto the work piece along the line of cut. This enables the flow to blow away sawdust that would likely otherwise accumulate were it not for the quadrant permitting passing of the air flow through it.

As a result of this airflow, the user seldom experiences the deposit of sawdust or debris produced by the cutting of whatever material is being cut on the line of cut which often necessitates interruption of the cutting operation.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power circular saw comprising:
  a motor housing;
  a motor having an output shaft located in the motor housing,
  a circular saw blade operatively driven by said output shaft, said blade being positioned to cut a work piece as said saw is moved in a forward direction,
  a foot structure connected to said motor housing and having a bottom surface for contacting a work piece;
  a protective blade housing surrounding approximately the portion of the saw blade that is located above said foot structure bottom surface;
  a fan blade operatively driven by said output shaft and positioned in said motor housing to draw air past said motor for cooling the same;
  said motor housing having at least one motor exit opening defining an air flow exit through which air generated by the fan passes, said motor exit opening being on the front of said motor housing so that air is expelled forwardly for the purpose of removing debris from the line of cut during operation of said circular saw;
  a bevel adjustment mechanism including a bevel quadrant connected to said foot structure, said bevel quadrant being located near the front of said foot structure and including a bevel pivot connection that permits said motor housing, blade and blade housing to be pivoted along a lengthwise axis substantially parallel to the plane of said saw blade;
  wherein said bevel quadrant has a generally triangular configuration with an arcuate slot in which a locking mechanism is located, said locking mechanism sliding along said slot when said bevel adjustment mechanism is adjusted to vary the angle of said bottom surface of said foot structure relative to the plane of said saw blade, said quadrant having at least three openings through which air can pass toward the work piece.

2. A circular saw as defined in claim 1 wherein said blade housing is connected to said motor housing and said at least one opening defined by the motor housing is located adjacent said blade housing.

3. A circular saw as defined in claim 1 wherein said motor housing includes a gearbox mounted thereto, said gearbox including said at least one motor exit opening.

4. A circular saw as defined in claim 3 wherein said gearbox has a plurality of vents separated by air directing vanes.

5. A power circular saw comprising:
  a motor housing;
  a motor having an output shaft located in the motor housing,
  a fan blade operatively driven by said output shaft,
  a circular saw blade operatively driven by said output shaft,
  a foot structure connected to said motor housing and having a bottom surface for contacting a work piece;
  a protective blade housing surrounding approximately the portion of the saw blade that is located above said foot structure bottom surface;
  a bevel adjustment mechanism including a bevel quadrant connected to said foot structure, said bevel quadrant being located near the front of said foot structure and including a bevel pivot connection that permits said motor housing, blade and blade housing to be pivoted along a lengthwise axis substantially parallel to the plane of said saw blade, said motor housing having at least one opening defining an air flow exit through which air generated by the fan passes, said opening being on the front of said motor housing so that air is expelled forwardly;
  wherein said bevel quadrant has a generally triangular configuration with an arcuate slot in which a locking mechanism is located, said locking mechanism sliding along said slot when said bevel adjustment mechanism is adjusted to vary the angle of said bottom surface of said foot structure relative to the plane of said saw blade, said quadrant having at least three openings through which air can pass toward the work piece.

6. A circular saw as defined in claim 5 wherein said blade housing is connected to said motor housing and said opening is located adjacent said blade housing.

7. A circular saw as defined in claim 5 wherein said motor housing includes a gearbox mounted thereto, said gearbox including said at least one opening.

8. A circular saw as defined in claim 7 wherein said gearbox has a plurality of vents separated by air directing vanes.

9. A power circular saw comprising:
  a motor housing;
  a motor having an output shaft located in the motor housing,
  a fan blade operatively driven by said output shaft, a circular saw blade operatively driven by said output shaft, a foot structure connected to said motor housing and having a bottom surface for contacting a work piece;

a protective blade housing surrounding approximately the portion of the saw blade that is located above said foot structure bottom surface;

a bevel adjustment mechanism including a bevel quadrant connected to said foot structure, said bevel quadrant being located near the front of said foot structure and including a bevel pivot connection that permits said motor housing, blade and blade housing to be pivoted along a lengthwise axis substantially parallel to the plane of said saw blade, said motor housing having a plurality of openings defining an air flow exit through which air generated by the fan passes, said opening being on the front of said motor housing so that air is expelled forwardly;

said quadrant having at least one opening therein to enable air expelled from said motor housing to pass through said bevel quadrant onto the work piece that is being cut, for the purpose of removing debris from the line of cut of said circular saw;

wherein said bevel quadrant has a generally triangular configuration with an arcuate slot in which a locking mechanism is located, said locking mechanism sliding along said slot when said bevel adjustment mechanism is adjusted to vary the angle of said bottom surface of said foot structure relative to the plane of said saw blade, said quadrant having a plurality of additional openings through which air can pass toward the work piece.

10. A circular saw as defined in claim 9 wherein said bevel adjustment mechanism pivot axis is located generally in the same plane as said saw blade.

11. A power circular saw comprising:

a motor housing with a motor therein;

a foot structure with a bevel adjustment mechanism, said motor having an output shaft that is operatively connected to drive a circular saw blade;

a blade housing connected to said motor housing and surrounding the portion of the blade that extends above the foot structure;

a fan blade in said housing operatively driven by said output shaft and being configured to move air through said housing to cool said motor;

said motor housing having at least one vent in the front thereof adjacent said blade housing configured to direct air exiting said motor housing downwardly toward the front of said foot structure for the purpose of removing saw dust and other debris from the front of said circular saw; and a bevel quadrant having a generally triangular configuration, a bevel adjustment mechanism and a locking mechanism, wherein said bevel quadrant has a generally triangular configuration with an arcuate slot in which a locking mechanism is located, said locking mechanism sliding along said slot when said bevel adjustment mechanism is adjusted to vary the angle of said bottom surface of said foot structure relative to the plane of said saw blade, said quadrant having at least three openings through which air can pass toward the work piece.

\* \* \* \* \*

UNITED STATES PATENT AND TRADEMARK OFFICE
CERTIFICATE OF CORRECTION

PATENT NO. : 7,475,482 B2  Page 1 of 1
APPLICATION NO. : 11/034497
DATED : January 13, 2009
INVENTOR(S) : Bocka et al.

It is certified that error appears in the above-identified patent and that said Letters Patent is hereby corrected as shown below:

Title Page:

insert --Related U.S. Application Data
(60) Provisional application No. 60/537,434, filed on Jan. 16, 2004--

Signed and Sealed this

Twenty-eighth Day of April, 2009

JOHN DOLL
*Acting Director of the United States Patent and Trademark Office*